(No Model.)

H. V. DUNN.
EDUCATIONAL DEVICE.

No. 302,194. Patented July 15, 1884.

WITNESSES:
W. W. Hollingsworth
H. X. Stevens

INVENTOR:
Hugh V. Dunn
BY Munn & Co.
ATTORNEYS.

N. PETERS. Photo-Lithographer. Washington, D. C.

UNITED STATES PATENT OFFICE.

HUGH V. DUNN, OF SCOTT'S DEPOT, WEST VIRGINIA.

EDUCATIONAL DEVICE.

SPECIFICATION forming part of Letters Patent No. 302,194, dated July 15, 1884.

Application filed December 11, 1883. (No model.)

*To all whom it may concern:*

Be it known that I, HUGH V. DUNN, a citizen of the United States, residing at Scott's Depot, in the county of Putnam and State of West Virginia, have invented certain new and useful Improvements in Educational Devices, of which the following is a specification.

The invention relates to that class of educational devices used in schools to teach a number of scholars at a time.

The object of my invention is to attract the attention of young children to teach a number of them at a time the alphabet, the multiplication-table, &c.

To this end my invention consists in the construction and combination of parts forming an educational device hereinafter described and claimed, reference being had to the accompanying drawings, in which—

Figure 1:
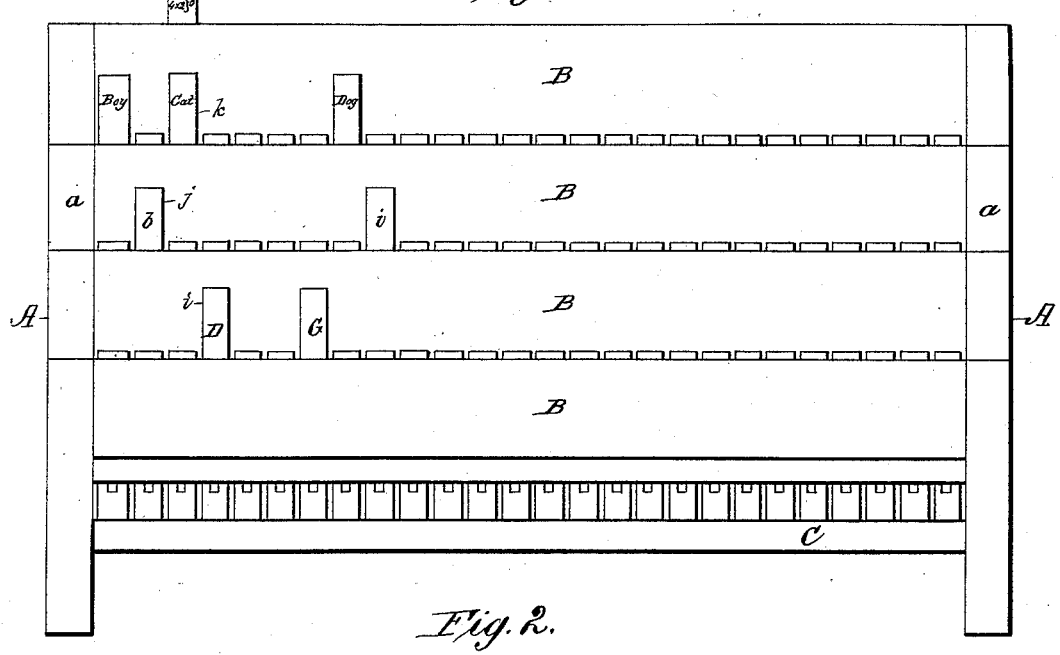
Figure 2:
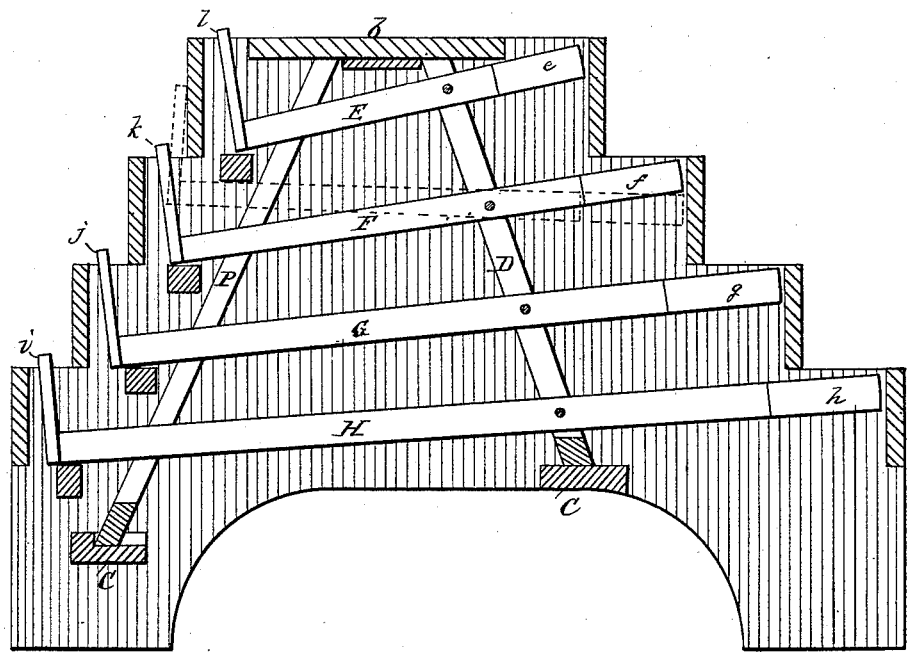

Figure 1 is a front elevation of my device, showing a few of the targets exposed. Fig. 2 is a transverse vertical section of the same.

A represents the frame, consisting of two end boards, $a$, notched on each side like stairs, and connected together by a number of front cross-boards, B, a top board, $b$, and two bottom strips, C.

D represents a series of standards, secured in pairs at their lower ends to one of the bottom strips, C, and at their upper ends to the top board, $b$. Between each pair of standards levers E F G H are pivoted, to tilt down by pressure of the teacher's finger on the rear ends, $e f g h$, thereby raising their other ends. A series of similar pairs of standards, P, fixed between the other bottom board and the top board, serve as guides to the respective levers to keep each in its own place or stall. Each of these other ends is provided with a target, $i j k l$, which normally rests out of sight behind one of the front boards, B, but is raised and exposed by pressing down the rear end, as described. One series of targets—$i$, for instance—may be provided with a capital-letter alphabet—one letter on each target—and on the finger-key or rear end of each lever will be a similar letter to the one on its target, so that the teacher may see what letter he is exposing to the child's view. Another series of targets—$j$, for instance—and their respective finger-keys, may be marked with the small letters of the alphabet. Another series may be marked with simple words. Another series of the signs may be marked with the multiplication-table, and I prefer to show it in the following manner: Place to the right of a bracket a multiple—take 8, for example. To the left place all the factors of this multiple—as 2×4 and 4×2, the whole to appear thus: $\left. \begin{array}{c} 2\times 4 \\ 4\times 2 \end{array} \right\} 8.$ On the finger-key of the same target the multiple 8 is placed as a guide to the teacher, and so on throughout a table of any desired extent. Other tables—such as addition and subtraction—may be shown in the same manner, and a series of the targets may be devoted to pictures of objects and their names. By this means the attention of children will be secured, and the objects, letters, figures, &c., thus shown will make a permanent impression on their memories, which would not be made were their curiosity not in some way excited; and by this means the teacher may instruct a large class as readily as a single child, thus saving much time.

This device may be made with any number of series of signs, and the signs may show any kind of illustrations or characters. When very firmly pressed upward, the back of each sign touches the front of the board above it just enough to retain the sign elevated, so that the teacher may leave any one or more of the signs exposed; yet when he wishes to conceal them he has merely to rap on the finger-key thereof, and they will be jarred loose and fall back to their normal position.

What I claim as my invention, and wish to secure by Letters Patent, is—

The combination, with a frame having two or more vertical front boards, bottom and top boards, and a series of standards secured thereto, of one or more series of levers pivoted to tilt between said standards, said levers having an exposed rear portion to serve as finger-keys, and sign-boards on their forward ends shaped to engage the said front boards when elevated, substantially as and for the purpose specified.

HUGH V. DUNN.

Witnesses:
L. P. PROFFITT,
J. H. NASH.